March 12, 1940.   H. O. DROTNING   2,193,022
FILM SPOOL CARRIAGE
Filed Sept. 13, 1938
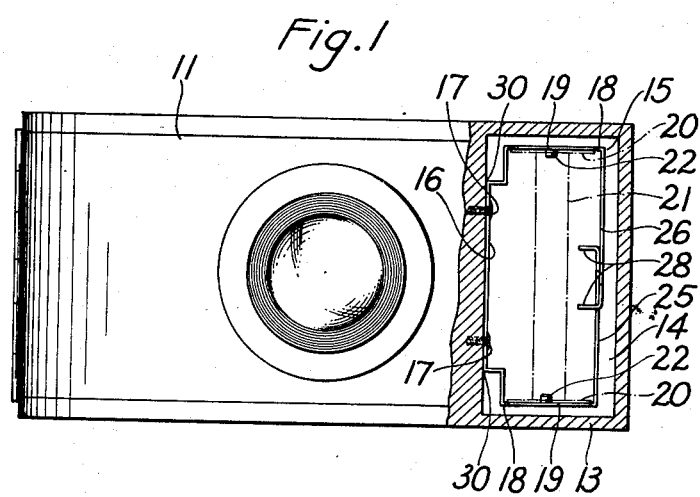
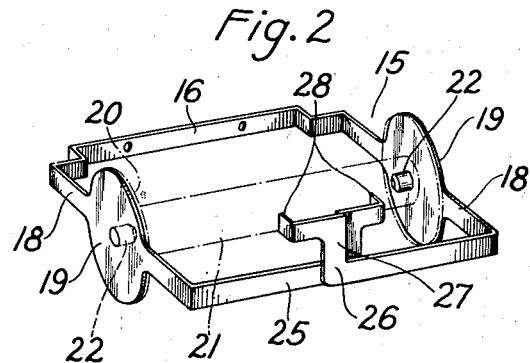
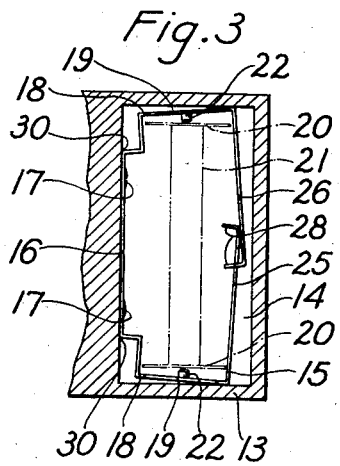
Henry O. Drotning
INVENTOR
BY
ATTORNEYS Patented Mar. 12, 1940

2,193,022

UNITED STATES PATENT OFFICE 2,193,022

FILM SPOOL CARRIAGE

Henry O. Drotning, Rochester, N. Y., assignor to Eastman Kodak Company, Rochester, N. Y., a corporation of New Jersey Application September 13, 1938, Serial No. 229,721

5 Claims. (Cl. 242—71)

The present invention relates to roll film cameras, and more particularly to a film spool carriage for such cameras.

One object of the invention is the provision of a spool carriage which simultaneously releases both ends of a film spool to facilitate the ready removal or replacement thereof.

Another object of the invention is the provision of a spool carriage which affords adequate support for both ends of the film spool.

A still further object of the invention is the provision of a spool carriage which is provided with spool releasing means accessible only from the inside of the camera, thus preventing accidental and unintentional release of the film spool.

To these and other ends, the invention resides in certain improvements and combinations of parts, all as will be hereinafter more fully described, the novel features being pointed out in the claims at the end of the specification.

In the drawing:

Fig. 1 is a front elevation view of a roll film camera with a portion thereof cut away to show one of the spool chambers in which is positioned a spool carriage constructed in accordance with the preferred embodiment of the invention, showing the spool carriage in the spool engaging and supporting position;

Fig. 2 is a perspective view of the preferred form of spool carriage, and

Fig. 3 is a front elevation view of a portion of the camera illustrated in Fig. 1, showing the spool carriage in the flexed or spool releasing position.

Similar reference numerals throughout the various views indicate the same parts.

The drawing shows a roll film camera 11 of any suitable and well-known construction, the ends 13 of which are formed with spool chambers 14, only one of which is shown. As the structural details of the camera do not constitute a part of the present invention, a detailed description thereof is not deemed necessary to an understanding of the present invention.

A film carriage, generally indicated by the numeral 15, is positioned within one of the spool chambers 14. This carriage is formed from a single piece of resilient material, preferably spring metal, to provide a hollow, rectangular member of the shape best shown in Fig. 2. One side 16 of the spool carriage is rigidly secured to the camera body by means of screws 17, or other suitable fastening means. The opposite ends 18 of the carriage are formed to provide enlarged portions or disks 19 which engage the end flanges 20 of the film spool 21. These disks 19 are formed with inwardly projecting trunnions 22 which extend into registering apertures, not shown, formed in the opposite ends of the film spool 21 to rotatably support the latter. These trunnions rigidly support the film spool and prevent distortion thereof during the film winding operation.

The other side 25 of the carriage 15 is closed by overlapping the free end 26 of the metal strip, as clearly shown in Fig. 2. These overlapping portions are then bent upwardly and outwardly to form a T-shaped connection 27, the ends of which are bent inwardly to provide finger-gripping portions 28. As the carriage 15 is made of resilient metal the portions 28 are normally maintained in the position shown in Fig. 2 so that the trunnion 22 will engage and adequately support the film winding operation. When, however, the spool is to be removed, or a new spool inserted, the portions 28 are gripped and pressed together to spring or flex the ends 18 outwardly and away from each other, as shown in Fig. 3, to permit the ready removal or replacement of the film spool 21. This pressing of the portions 28 serves to bend or flex the spool carriage about the point 30 which form, in effect, spring hinges or pivots for the ends 18. For this reason the ends 18 and their film supporting trunnions 22 may be broadly considered as pivotally or hingedly mounted on the spool carriage.

It is apparent from the above description that both ends 18 are simultaneously moved to disengage the film spool. Furthermore, as the finger-gripping portions 28 are accessible only from the inside of the camera and only after the back thereof has been removed, it is apparent that accidental or inadvertent disengaging of the film spool is prevented, the disadvantages of which will be readily apparent to those in the art. While the present embodiment shows a spool carriage adaption to rotatably support a supply spool, it is apparent that such a carriage, with slight modification, may also be used to support a take-up spool.

While one embodiment of the invention has been disclosed, it is apparent that the inventive idea may be carried out in a number of ways. The present application is therefore not to be limited to the precise details described, but is intended to cover all variations and modifications falling within the spirit of the invention or the scope of the appended claims.

I claim:

1. In a roll film camera, the combination with a spool chamber, of a spool carriage mounted in said chamber, a pair of flexible members formed from the material of said carriage for yieldably engaging opposite ends of a film spool to rotatably support the latter, and a pair of presser members formed from the free ends of said material and arranged to be moved substantially in a plane for simultaneously moving both of said flexible members to permit removal of said spool.

2. In a roll film camera, the combination with a spool chamber, of a spool carriage mounted in said chamber, a pair of movably mounted members formed on said carriage for engaging opposite ends of a film spool to rotatably support the latter, the ends of said members being arranged in overlapping relation to provide a T-shaped portion and means formed integral with said portion for moving both of said members to permit removal or insertion of said spool.

3. In a roll film camera, the combination with a spool chamber, of a spool carriage mounted in said chamber and formed from a single strip of sheet material to provide a pair of resiliently mounted disks, trunnions on said disks for engaging opposite ends of a film spool to rotatably support the latter, and a pair of overlapping members formed on the free ends of said material and arranged to be pressed toward each other to separate said disks to permit removal or insertion of said spool.

4. In a roll film camera, the combination with a spool chamber, of a spool carriage positioned in said chamber and formed from a single strip of resilient material to provide a pair of members arranged to engage and rotatably support opposite ends of a film spool, the ends of said strip being arranged in overlapping relation to provide finger gripping portions which when pressed together will separate said members to permit insertion or removal of said spool.

5. In a roll film camera, the combination with a camera body formed with a spool chamber, of a hollow rectangular member positioned within said chamber and formed from a single strip of resilient material to provide a spool carriage having sides and ends, one of said sides being rigidly secured to said body, spool supporting trunnions formed on the ends of said carriage, the free ends of said strip being arranged in overlapping relation to form the other side of said carriage, and finger gripping portions on said free ends arranged to be pressed together to simultaneously move said trunnions to separate the latter to permit easy removal or replacement of said spool.

HENRY O. DROTNING.